US009272574B2

(12) United States Patent
Ebert

(10) Patent No.: US 9,272,574 B2
(45) Date of Patent: Mar. 1, 2016

(54) SPINDLE NUT AND WASHER ASSEMBLY AND METHOD OF UTILIZATION

(71) Applicant: James L. Ebert, Huron, OH (US)

(72) Inventor: James L. Ebert, Huron, OH (US)

( * ) Notice: Subject to any disclaimer, the term of this patent is extended or adjusted under 35 U.S.C. 154(b) by 264 days.

(21) Appl. No.: 13/838,950

(22) Filed: Mar. 15, 2013

(65) Prior Publication Data

US 2014/0259673 A1   Sep. 18, 2014

(51) Int. Cl.
| | | |
|---|---|---|
| B60B 27/00 | (2006.01) |
| F16C 35/063 | (2006.01) |
| F16B 39/02 | (2006.01) |
| B60B 35/00 | (2006.01) |
| B60B 27/06 | (2006.01) |

(52) U.S. Cl.
CPC ........... B60B 27/0078 (2013.01); F16B 39/028 (2013.01); F16C 35/063 (2013.01); B60B 27/06 (2013.01); B60B 35/004 (2013.01); B60B 2900/113 (2013.01); Y10T 29/49696 (2015.01); Y10T 29/49963 (2015.01)

(58) Field of Classification Search
CPC .... B60B 27/02; B60B 27/0078; B60B 37/10; B60B 35/004; F16B 39/028; F16B 39/103; F16C 35/063; B23P 19/06
USPC ............... 301/105.1, 111.03, 124.1; 384/544; 411/286, 288, 290
See application file for complete search history.

(56) References Cited

U.S. PATENT DOCUMENTS

| | | | | |
|---|---|---|---|---|
| 171,898 | A * | 1/1876 | Wiles | 411/286 |
| 288,299 | A * | 11/1883 | Bliss | 411/286 |
| 3,667,525 | A * | 6/1972 | Spieth | 411/292 |
| 3,746,412 | A * | 7/1973 | Hay | 384/563 |
| 4,557,652 | A * | 12/1985 | Lundgren | 411/230 |
| 5,090,778 | A * | 2/1992 | Laudszun et al. | 301/105.1 |
| 5,540,529 | A * | 7/1996 | Jansson et al. | 411/291 |
| 5,609,456 | A * | 3/1997 | Joki | 411/433 |
| 5,662,445 | A * | 9/1997 | Harbottle et al. | 411/433 |
| 7,600,958 | B2 * | 10/2009 | Metzger | 411/286 |
| 2006/0013673 | A1* | 1/2006 | Metzger | 411/286 |
| 2011/0291468 | A1* | 12/2011 | Rieger et al. | 301/105.1 |
| 2012/0230798 | A1* | 9/2012 | Sterle | 411/120 |

* cited by examiner

Primary Examiner — Kip T Kotter
(74) Attorney, Agent, or Firm — David D. Murray; Raymond J. Vivacqua

(57) ABSTRACT

An apparatus for and a method of securing hubs and bearings on truck spindles includes a flat or non-flat washer with a key and a nut having an integral and axially spaced locking ring with threads through the nut and locking ring complementary to threads on a spindle. The nut also includes a plurality of axially oriented threaded openings and a plurality of threaded fasteners that extend through apertures in the locking ring and into the threaded openings. An alternate embodiment includes a washer, a nut having threads complementary to threads on the spindle and a plurality of axially oriented threaded openings, a locking plate having a pattern of arcuate slots and a key which engages a keyway on the spindle and a plurality of fasteners which secure the locking plate to the nut in a desired position.

14 Claims, 7 Drawing Sheets

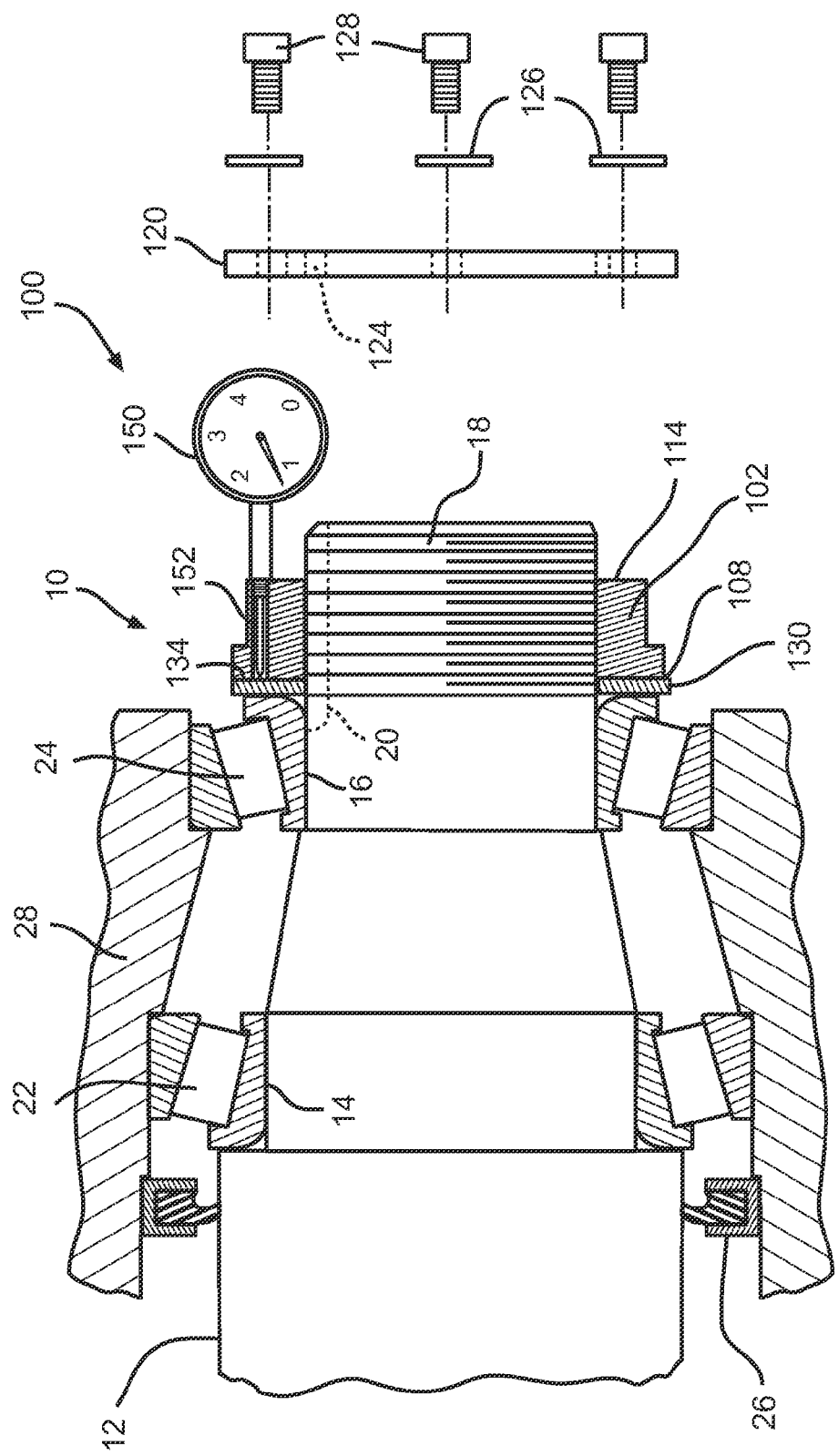

SPINDLE NUT AND WASHER ASSEMBLY AND METHOD OF UTILIZATION

FIELD

The present disclosure relates to apparatus for retaining hubs on truck axle spindles and more particularly to nut and washer assemblies for securing hubs on truck axle spindles and a method of utilizing the same.

BACKGROUND

The statements in this section merely provide background information related to the present disclosure and may or may not constitute prior art.

Long haul trailers of semi-tractors and trailers may readily log over one hundred thousand miles a year. After the tires, the most significant wear item is the interface between the rotating tires and wheels and the stationary axles. This interface includes pairs of roller bearings which support each tire and wheel assembly on each axle.

Although well designed, the failure of the bearings and damage to the terminal portion of the axle, the spindle, is essentially a matter of time. That said, such failures are seldom predictable and it thus has not been found reasonable or economically practical to undertake preventative maintenance which typically includes replacement of these components. The result of the foregoing is that failure of these truck axle components will generally occur without warning and at some distance from a truck terminal or qualified repair facility.

I have therefore developed several on-site axle repair machines, components and procedures that render the repair of such truck axle failures at the failure site rapid, efficient, safe and far less expensive than towing the truck or trailer to a repair facility and replacing the entire axle. For example, my U.S. Pat. No. 6,024,418 discloses a repair method utilizing a long spindle having both inner and outer bearing surfaces and a sleeve or liner. After the damaged end of the axle has been removed, the spindle and liner are installed in the axle and welded at several locations away from regions of significant stress.

Whether completing the repair process described directly above or simply re-assembling a wheel hub and bearings after inspection and lubrication, one of the final steps is the re-installation of a washer and nut to retain the wheel hub and bearings on the threaded spindle. In one arrangement, the nut is a pair of thin nuts. A first or inner nut is tightened down to a specified torque to provide a preload on the bearings and then a second nut is rotated against the first nut to lock it in place.

This arrangement is not ideal for two reasons. First of all, although the first nut can be accurately torqued down to provide the proper bearing preload, when the second (lock) nut is tightened against it, the preload will generally increase to an unknown value. This is because the first nut, as it is tightened or torqued down, is forced away from the bearings and toward the inside faces of the threads on the spindle. However, when the second (lock) nut is tightened against it, it moves slightly inward such that it resides against the outside faces of the threads. This axial translation will increase the bearing preload by some unknown amount. Thus, even if the first nut were initially properly tightened or torqued to apply the proper bearing preload, tightening the second (lock) nut will increase the bearing preload. Second of all, the second (lock) nut which, when tightened, is carrying essentially all of the axial force is thin and can thus distort or damage the small number of spindle threads it is engaging under certain conditions. This, in turn, may make removal of the outer nut difficult or virtually impossible.

Another arrangement utilizes a nut with plural locking features that can be engaged by a pin that is held against rotation by a keyway on the spindle. Again, the nut is torqued down against the wheel and bearings to provide the proper preload. Now, however, since the locking features are spaced about the nut at, for example, 30 degree circumferential intervals, the nut must be rotated (typically back or out) to align a locking feature with the pin. Such rotation changes, and typically reduces, the optimum bearing preload.

From the foregoing, it is apparent that there is a need for improved components and an installation method addressing the problems of properly mounting, preloading bearings and tightening truck axle spindle nuts. The present invention is so directed.

SUMMARY

The present invention provides an apparatus for and a method of securing wheel hubs and bearings on truck axles or spindles. The preferred embodiment of the apparatus includes a flat or non-flat washer such as a frusto-conical (Belleville spring) washer or a wave washer having a key and a nut having an integral and axially spaced apart locking plate or ring with male threads in a center opening in the nut and locking ring complementary to threads on an axle or spindle. The nut also includes a plurality of axially oriented smaller threaded openings, and a plurality of complementary threaded fasteners that extend through apertures in the locking ring and into the threaded openings. An alternate embodiment of the apparatus includes a flat or non-flat washer, a nut having a center opening and threads complementary to threads on an axle or spindle and a plurality of axially oriented smaller threaded openings, a locking plate or ring having a pattern of arcuate slots and a key which engages a keyway on the spindle and a plurality of fasteners which secure the locking plate to the nut in a desired position.

The method includes the steps of first assembling the bearings and hub on the axle (spindle). Next, the washer is placed on the spindle with the key in the keyway of the spindle and the nut is threaded onto the spindle and the nut is tightened until the desired bearing preload is achieved. If the non-flat washer is being utilized, it will be compressed until it is nearly flat. A feeler gauge or a dial indicator may be utilized to make this determination. Then, without disturbing the rotational position of the nut, and with regard to the first embodiment nut described above, the plurality of machine screws in the locking ring are tightened to distort the ring and tightly secure the nut to the spindle. With the alternate embodiment nut, the locking ring is disposed on the spindle so that both the key is in the spindle keyway and several of the arcuate slots line up with the threaded openings in the nut, the fasteners are tightened to secure the locking ring to the nut and prevent rotation of the nut.

Thus it is an aspect of the present invention to provide a nut assembly for securing a wheel hub to a truck, tractor or trailer axle or spindle.

It is a further aspect of the present invention to provide an assembly for a truck, tractor or trailer axle having a flat or non-flat washer, a nut and a locking ring.

It is a further aspect of the present invention to provide an assembly for a truck, tractor or trailer axle having a spring washer, a nut and a locking ring.

It is a still further aspect of the present invention to provide an assembly for a truck, tractor or trailer axle having a flat or non-flat washer, a nut and an integral locking ring.

It is a still further aspect of the present invention to provide an assembly for a truck, tractor or trailer axle having a spring washer, a nut and an integral locking ring.

It is a still further aspect of the present invention to provide an assembly for a truck, tractor or trailer axle having a flat or frusto-conical washer, a nut with a plurality of threaded axial openings and a locking ring with a plurality of openings.

It is a still further aspect of the present invention to provide an assembly for a truck, tractor or trailer axle having a flat or frusto-conical washer, a nut with a plurality of threaded axial openings and a locking ring with a key and a plurality of arcuate slots.

It is a still further aspect of the present invention to provide method for securing a wheel hub and bearings to a truck, tractor or trailer axle.

It is a still further aspect of the present invention to provide method for securing a wheel hub and bearings to a truck, tractor or trailer axle utilizing a flat or spring washer, a nut and locking ring.

It is a still further aspect of the present invention to provide a method of assembling a nut on a truck, tractor or trailer axle having a pair of bearings including the step of substantially flattening a non-flat washer disposed between an outer wheel bearing and the nut.

It is a still further aspect of the present invention to provide a method of assembling a nut on a truck, tractor or trailer axle having a pair of bearings including the step of securing a locking ring to the nut.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8 is a fragmentary, side elevational view of a portion of a motor vehicle axle (spindle), a bearing, a non-flat spring washer, a nut and a dial indicator measuring the deflection of the washer before installing the locking ring a fasteners;

DETAILED DESCRIPTION

The following description is merely exemplary in nature and is not intended to limit the present disclosure, application, or uses.

Figure 1:
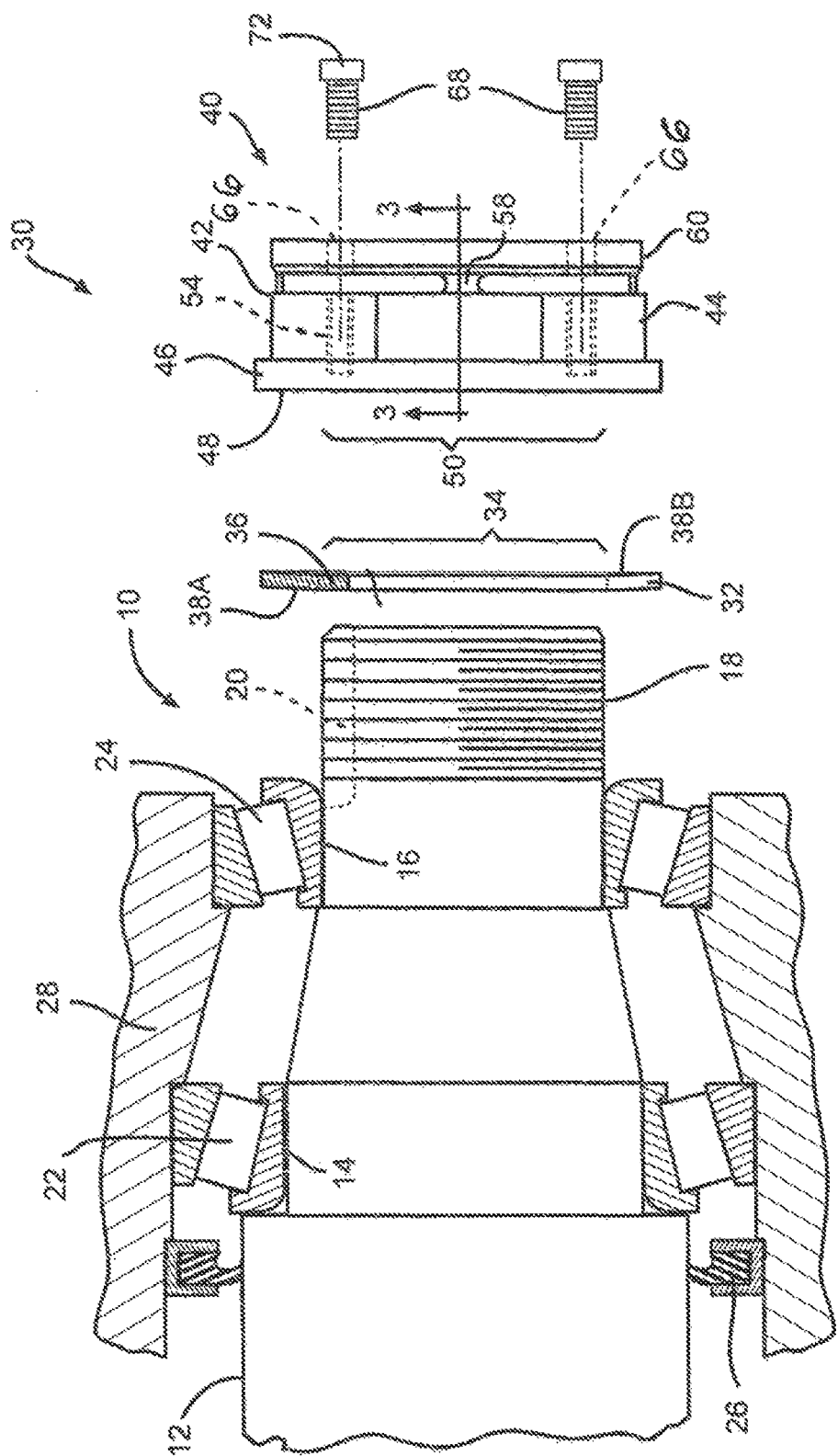
FIG. 1 is an exploded, side elevational view of a motor vehicle axle (spindle) and a first embodiment washer and nut and locking ring assembly according to the present invention.
Figure 2:
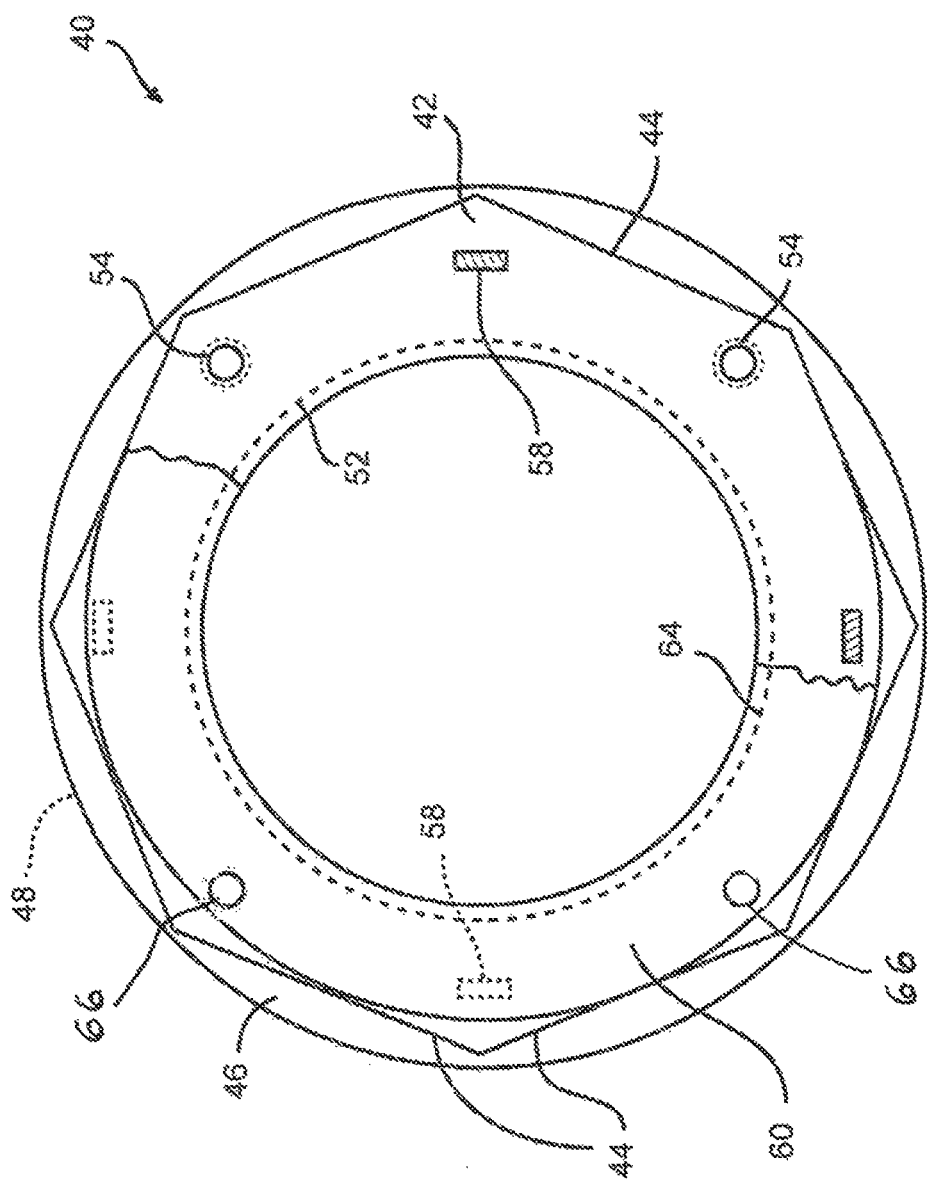
FIG. 2 is a plan view of a first embodiment octagonal nut and locking ring assembly according to the present invention with a portion of the locking ring broken away.

With reference to FIGS. 1 and 2, a typical and exemplary motor vehicle truck tractor or trailer spindle is illustrated and generally designated by the reference number 10. As utilized herein, the term "spindle" means and refers to the terminal portion of either a truck tractor or trailer axle. The spindle 10 includes an oil seal surface 12, an inner bearing surface 14, an outer bearing surface 16 axially spaced from the inner bearing surface 14, a region of male threads 18 on a terminal portion of the spindle 10 and a keyway 20. The spindle 10 may be hollow and receive a drive axle (not illustrated), be plugged with a cylindrical elastomeric seal (also not illustrated) or be solid.

As noted above, the spindle 10 represents the interface between the stationary structure of the tractor or trailer frame and suspension and the rotating hub, wheel and tire. Thus, the spindle 10 receives and supports an inner tapered roller bearing assembly 22 on the inner bearing surface 14 and an outer tapered roller bearing assembly 24 on the outer bearing surface 16. The inner and outer tapered roller bearing assemblies 22 and 24 as well as an elastomeric oil seal 26 which contacts the oil seal surface 12 on the spindle 10 are, in turn, received within, supported and retained by a hub or wheel hub 28, a portion of which is illustrated in FIG. 1. The wheel hub 28 is circular, may be of various configurations and materials and receives and supports a wheel and tire assembly (not illustrated).

A first embodiment of a washer, nut and locking ring assembly 30 is disposed adjacent the outer tapered roller bearing assembly 24 and includes a flat or non-flat, i.e., frusto-conical or Belleville spring, washer 32. As indicated, the washer 32 may be either flat or have a shape such as a Belleville spring or wave washer that provides a spring biasing or restoring force when compressed. The special benefit to utilizing a spring washer will be described more extensively in the paragraphs devoted to the method of utilization appearing below. The washer 32 defines a circular opening 34 and includes a radially inwardly directed lug or key 36 that is complementary to and received within the keyway 20 of the spindle 10. The inside and outside diameters and the thickness and the angle of offset or conicity of the washer 32 if the washer is a spring washer will vary according to its application. The diameter of the circular opening 34 of the washer 32, that is, the inside diameter of the washer 32, will be determined by the major diameter of the male threads 18 on the terminal portion of the spindle 10.

Preferably, the diameter of the circular opening 34 will be just slightly larger than the major diameter of the male threads 18 on the spindle 10. The thickness of the washer 32, if it is a flat washer, will be determined primarily by its desired strength or, if it is a non-flat, i.e., spring washer, it will be determined primarily by the desired spring rate (constant). In either case, the thickness is preferably in the range of about 0.120 inches (3.05 mm.) to about 0.160 inches (4.06 mm.) or more or less. The axial conicity, if it is a spring washer, will be determined primarily by the desired compressive travel of the washer 32. Typically, the conicity may be in the range of from 0.003 inches (0.076 mm.) to 0.008 inches (0.203 mm.) or more with 0.005 inches (0.127 mm.) having been found to be a useful, average and typical value.

The washer 32, if it is a flat washer, may, of course, be simply placed on the spindle 10, as it is orientation insensitive. If it is a spring washer, in a relaxed state, it is preferably arranged on the spindle 10 with the convex face or surface 38A facing inward and the concave face 38B facing outward, that is, with the inner diameter more proximate the bearing surface 16 and the roller bearing assembly 24. It will be appreciated that, if it is a spring washer, the conicity, i.e., the non-flat shape, of the washer 32 has been exaggerated somewhat in FIG. 1, for purposes and reasons of explanation and clarity. It should also be appreciated that a non-flat, i.e., spring, washer 32 may be installed in the opposite direction on the spindle 10 such that it faces the opposite way as will be described subsequently.

An octagonal nut and integral locking ring assembly 40 includes an octagonal nut 42 having a plurality of, preferably eight, flats 44. While both the length of the flats 44 and the maximum apex to apex diametral distance of an eight sided, i.e., octagonal, nut 42 has been found optimum, and in fact preferred, for this service, it should be understood that more or fewer flats 44 on the nut 42, for example, six, ten or twelve may be utilized. Adjacent the flats 44, the octagonal nut 42 includes a circular flange 46 which, as illustrated in FIG. 2, extends radially beyond the flats 44 and includes a flat, end face or surface 48. The octagonal nut 42 includes an axial circular aperture 50 having female threads 52 which are complementary to the male threads 18 on the terminal portion of the spindle 10. Disposed about the circular aperture 50, preferably in a bolt circle or similar array, are a plurality of axially oriented threaded blind openings 54. As illustrated in FIG. 2, there are preferably four threaded blind openings 54 but it should be understood that more or fewer threaded openings 54 may be utilized if desired.

Referring now to FIGS. 1, 2, 3 and 4, connected to the octagonal nut 42 by a plurality of, preferably four, lugs, bridges, webs, stanchions or standoffs 58 and axially spaced therefrom is a deformable locking ring 60. Preferably, the locking ring 60 is integrally formed with the octagonal nut 42 from a single blank or piece of metal stock through suitable machining operations. The octagonal nut 42 and the locking ring 60 may, however, be assembled from two individually fabricated components that are secured together in the desired spaced apart relationship illustrated in FIGS. 1 and 3 by, for example, welding or a plurality of spacers and threaded fasteners (not illustrated).

Figure 3:
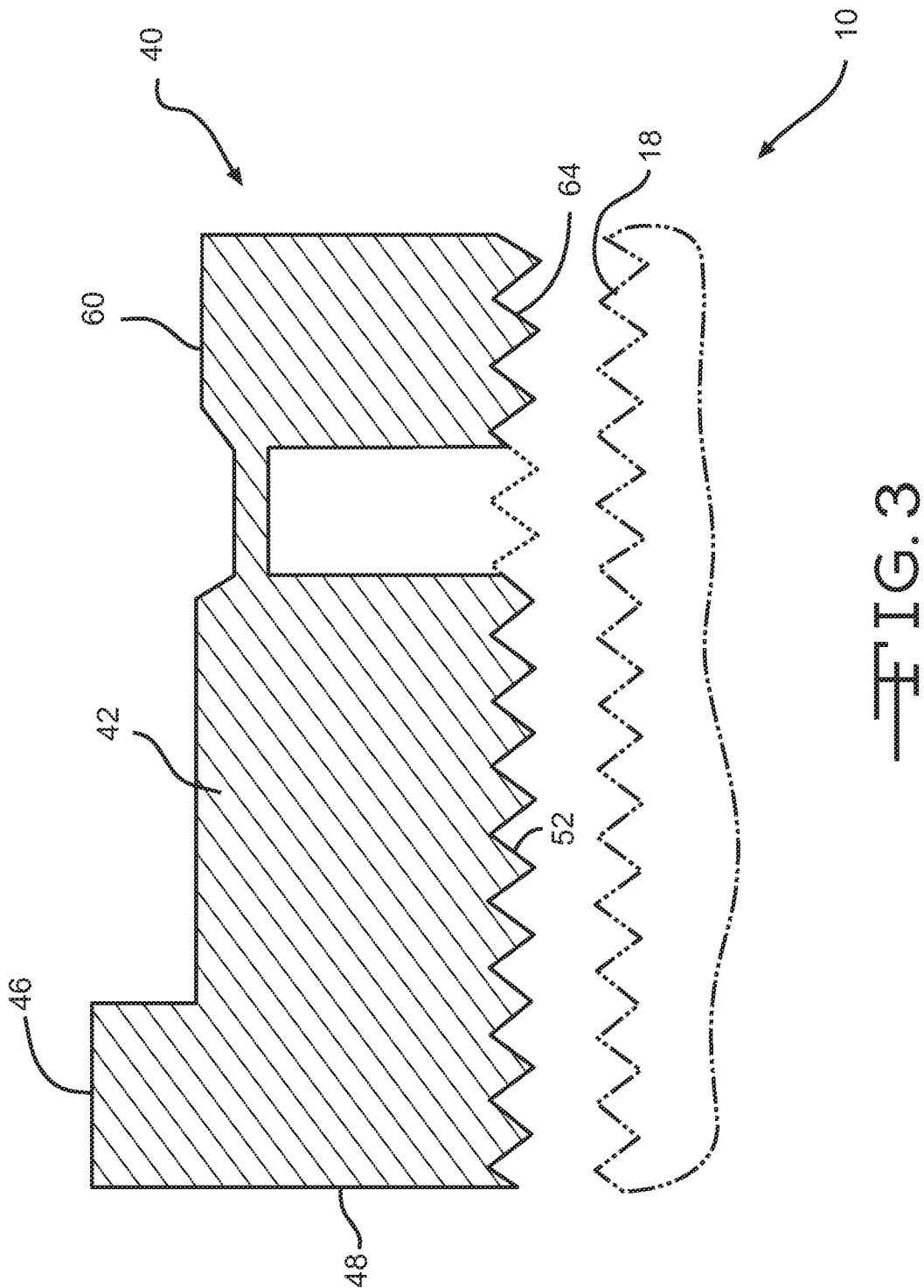
FIG. 3 is an enlarged, fragmentary, sectional view of the internal (female) threads of the nut and locking ring assembly according to the present invention taken along line 3-3 of FIG. 1.

The deformable locking ring 60 includes a circular aperture 62 having female threads 64 which, as illustrated in FIG. 3, are a continuation of the female threads 52 and the thread pitch in the octagonal nut 42 such that the male threads 18 of the terminal portion of the spindle 10, shown in phantom in FIG. 3, readily and smoothly engage both the female threads 52 of the octagonal nut 42 and the female threads 64 of the deformable locking ring 60.

The deformable locking ring 60 also includes a plurality of axially oriented smooth walled openings 66 that align with the threaded blind openings 54 in the octagonal nut 42 and receive, with a clearance fit, a like plurality of threaded fasteners such as machine screws 68. The machine screws 68 preferably include socket heads 72 that may be engaged by axially oriented tools such as an Allen wrench (not illustrated).

Figure 4:
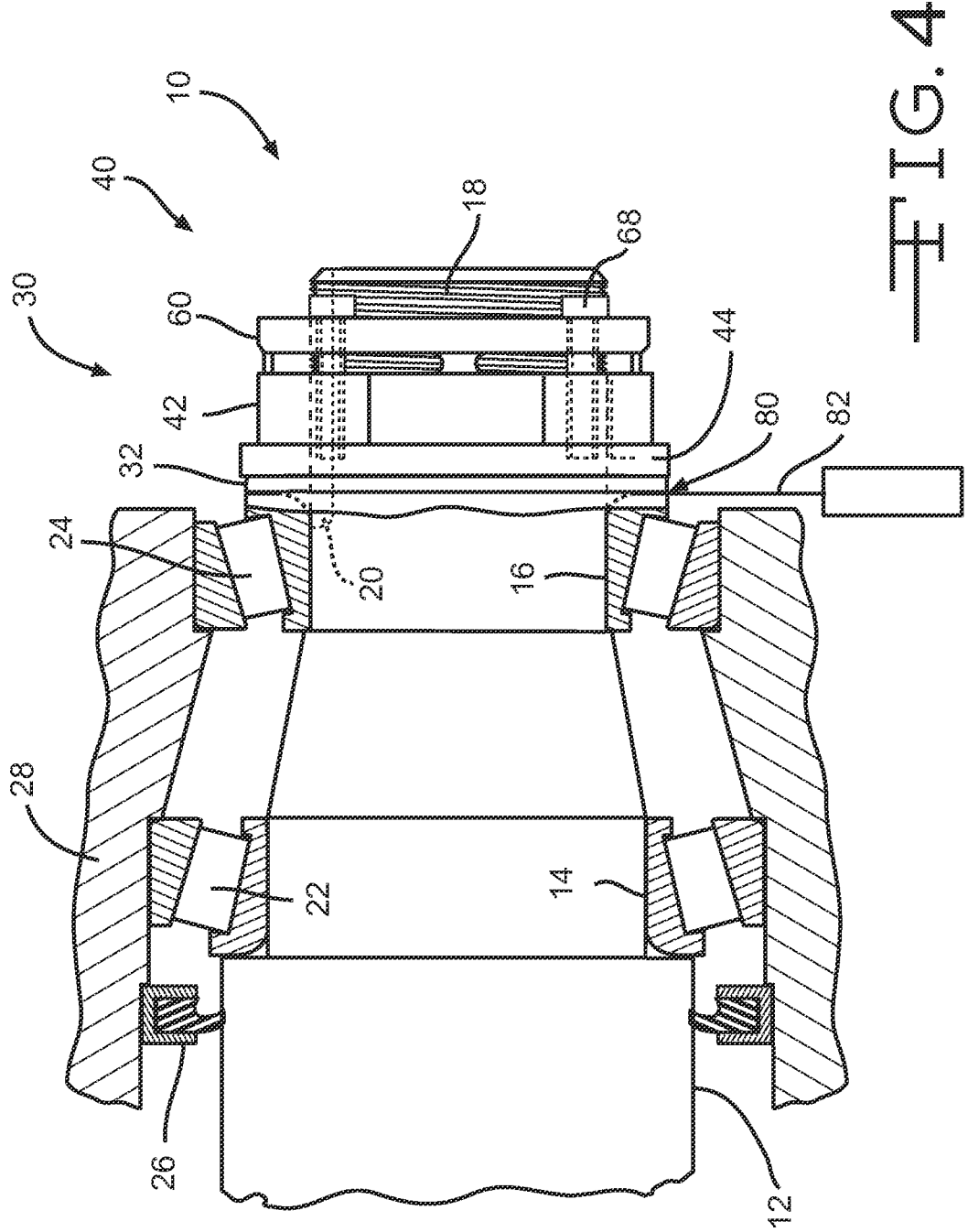
FIG. 4 is a fragmentary, side elevational view of a portion of a motor vehicle axle (spindle), a bearing, a non-flat spring washer, a nut and a feeler gauge measuring the deflection of the washer before tightening the screws on the locking ring.

Referring now to FIGS. 1 and 4, a method of mounting and securing the wheel hub 28 and preloading the pair of tapered roller bearing assemblies 22 and 24 on the spindle 10 according to the present invention will now be described. First of all, the hub 28, including the tapered inner roller bearing assembly 22 and the oil seal 26 are mounted on the spindle 10, as illustrated in FIGS. 1 and 4. Then, the tapered outer roller bearing assembly 24 and the washer 32, with its key 36 aligned with and received in the keyway 20 and, if it is a frusto-conical, i.e., Belleville spring washer, with its concave face or surface 38B preferably facing toward the outer end of the spindle 10, are placed on the end of the spindle 10.

At this juncture, there are three approaches to properly preloading the roller bearings 22 and 24 which may be practiced separately and independently of one another. A first approach, utilizing a flat washer 32, involves simply applying torque to the octagonal nut 42 until a desired axial preload on the inner and outer roller bearing assemblies 22 and 24 is achieved. When this has been accomplished, the machine screws 68 are tightened to deform the deformable locking ring 60, thereby securing the octagonal nut and integral locking ring assembly 40 to the spindle 12.

A second approach is illustrated in FIG. 4 and a third approach is illustrated in FIG. 8. In the second approach, the octagonal nut and the integral locking ring assembly 40 are threaded on to the male threads 18 of the spindle 10 and tightened (torqued) down against the non-flat spring washer 32 until a small but measurable gap or clearance 80, such as 0.001 inches (0.025 mm.) or 0.0015 inches (0.037 mm.) exists between the outer edge of the non-flat washer 32 and the face of the outer roller bearing assembly 24.

To measure this gap or clearance 80, the first approach involves use of a feeler gauge 82 having a thickness of, for example, 0.001 inches (0.025 mm.) or 0.0015 inches (0.037 mm.), the width of the desired gap or clearance 80. Thus, the octagonal nut and integral locking ring assembly 40 are rotated and tightened on the male threads 18 of the spindle 10 until the feeler gauge 82 just slides radially into the gap or clearance 80 about the periphery of the non-flat spring washer 32 indicating that the non-flat spring washer 32 has been deformed to the desired extent so that it is applying a desired preload. Finally, without rotating the octagonal nut and integral locking ring assembly 40, the machine screws 68 are tightened to slightly deform or distort the locking ring 60 so that the octagonal nut 42 and the locking ring 60 are securely and non-rotatably locked to the spindle 10 to ensure maintenance of the preload on the inner and outer roller bearing assemblies 22 and 24. It will be appreciated that the key 36 in the washer 32 inhibits its rotation and thus the transfer of any rotational motion from the outer roller bearing assembly 24 or the hub 28 to the nut and locking ring assembly 40, thereby additionally ensuring maintenance of its position and the bearing preload. With the exception of a grease cap or other cosmetic component (not illustrated), the installation of the wheel hub 28 on the spindle 10 is now complete.

As noted above, the thickness of the non-flat spring washer 32 primarily determines its spring rate (constant) and the deflection of the non-flat spring washer 32 determines the preload on the roller bearings 22 and 24, and a gap or clearance 80 of about 0.001 inches to about 0.0015 inches has been found to be a functional, nominal value. Larger, but generally not smaller, gaps or clearances 80 may be set depending upon the desired preload of the roller bearings 22 and 24 and the initial (relaxed) configuration, the thickness and the spring constant of the non-flat spring washer 32.

Creating and maintaining this gap or clearance 80 during assembly is critical because with it, a certain non-flat spring washer 32 will provide a certain preload on the roller bearings 22 and 24 if so compressed and substantially flattened. If the gap or clearance 80 is larger than desired, it is apparent the preload on the roller bearings 22 and 24 will be less than desired. However, if the gap or clearance 80 is non-existent, i.e., the octagonal nut and locking ring assembly 40 has been over-tightened, such that there is no longer any gap or clearance 80 between the non-flat washer 32 and the outer roller bearing assembly 24, the extent of bearing preload is simply unknown. Is the preload a few pounds over that desired? Is it one hundred pounds over that desired?

Figure 5:
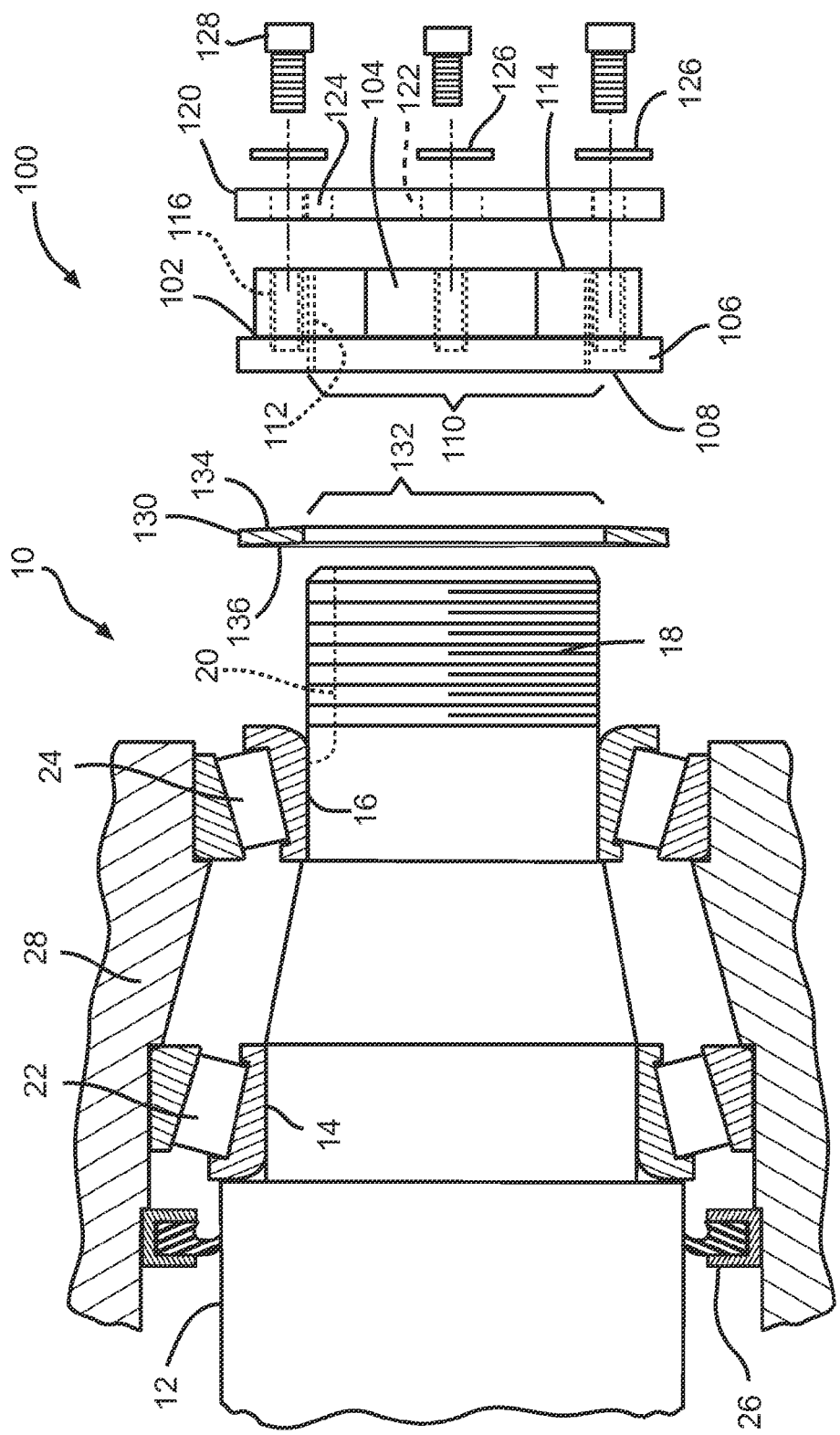
FIG. 5 is an exploded, side elevational view of a motor vehicle axle (spindle) and an alternate embodiment washer, nut and locking ring assembly according to the present invention.
Figure 7:
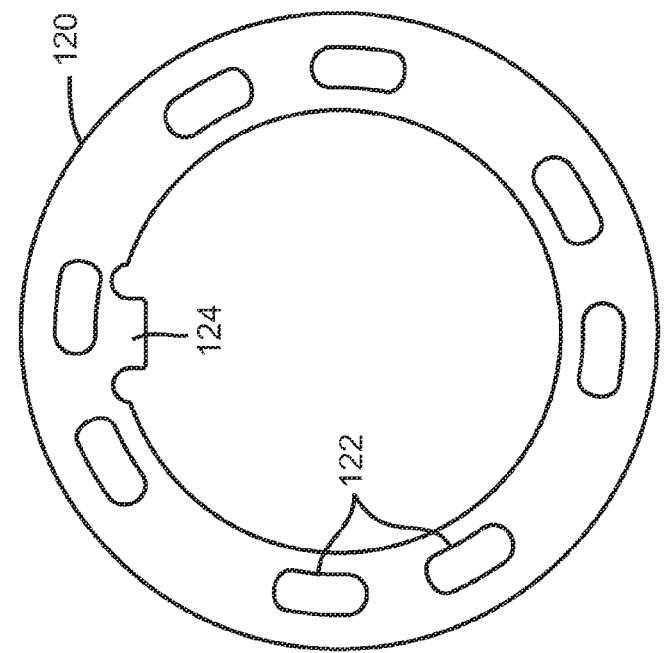
FIG. 7 is a plan view of an alternate embodiment locking ring according to the present invention.
Figure 6:
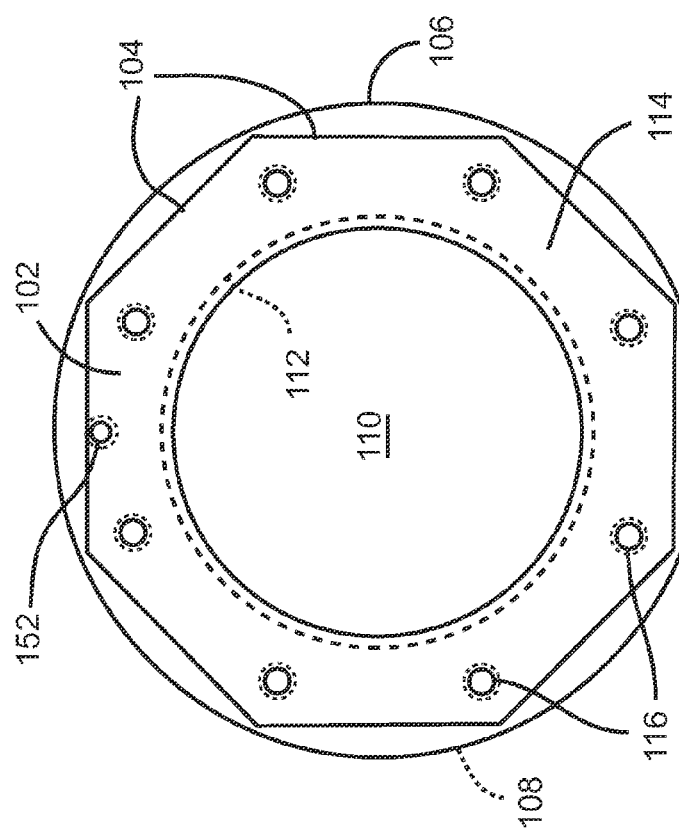
FIG. 6 is a plan view of an alternate embodiment octagonal nut according to the present invention.

Referring now to FIGS. 5, 6 and 7, an alternate embodiment washer, nut and locking ring assembly, according to the present invention and designated by the reference number 100, is illustrated. The alternate embodiment washer, nut and locking ring assembly 100 is utilized with the same motor vehicle axle (spindle) components such as the spindle 10 having the oil seal surface 12, the inner bearing surface 14, the outer bearing surface 16, the region of male threads 18 and the keyway 20. Disposed thereon are the inner tapered roller bearing assembly 22, the outer tapered roller bearing assembly 24, the elastomeric oil seal 26 and the wheel hub or hub 28. The alternate embodiment washer, nut and locking ring assembly 100 includes an octagonal nut 102 also preferably having eight flats 104 and an adjacent circular flange 106 defining a flat, radially extending inner end face 108. While both the length of the flats 104 and the maximum apex to apex diametral distance of an eight sided, i.e., octagonal, nut 102 has been found optimum for this application, it should be understood that more or fewer flats 104 on the nut 102, for example, six, ten or twelve may be utilized. The octagonal nut 102 includes an axial circular aperture 110 having female threads 112 which are complementary to the male threads 18 on the terminal portion of the spindle 10.

On an outer end face 114 of the octagonal nut 100 opposite the flat, inner end face 108 are a plurality of, preferably eight, blind, axially extending threaded openings 116. A locking ring 120 having an inside diameter just slightly larger than the major diameter of the male threads 18 on the spindle 10 includes a plurality of arcuate slots 122 and an inwardly extending key 124 which is complementary to the keyway 20 in the spindle 10. The locking ring 120 is retained on the outer end face 114 of the octagonal nut 100 by a plurality of flat washers 126 and threaded fasteners 128, such as hex head machine screws. Because of the arrangement of the arcuate slots 122 relative to the key 124, the pattern of arcuate slots 122 need not repeat around the locking ring 120, thereby eliminating some machining of the locking ring 120. It should be understood, however, that a uniform pattern of arcuate slots 122 about the locking ring 120 may be provided, if desired, and is fully within the scope of the present invention.

The alternate embodiment washer, nut and locking ring assembly 100 also preferably includes a flat or non-flat, i.e., frusto-conical or Belleville spring, washer 130 disposed between the outer tapered roller bearing assembly 24 and the flat, inner end face 108 of the octagonal nut 102. The flat or non-flat, i.e., frusto-conical or Belleville spring, washer 130 defines a circular opening 132. It the washer 130 is a non-flat washer, the inside and outside diameters, the thickness and the angle of offset or conicity of the non-flat washer 130 will vary according to its application, as noted above.

The diameter of the circular opening 132 of the washer 130, that is, the inside diameter, will be determined by the major diameter of the male threads 18 on the terminal portion of the spindle 10. Preferably, the diameter of the circular opening 132 will be just slightly larger that the outside diameter of the male threads 18 on the spindle 10. The thickness of the washer 130, if it is a flat washer, will be primarily determined by its desired strength or, if it is a non-flat, i.e., spring washer, it will be primarily determined by the desired spring rate (constant). In either case, the thickness is typically between about 0.120 inches (3.05 mm.) and 0.160 inches (4.06 mm.), or more or less. If it is a non-flat washer, the axial conicity will be primarily determined by the desired compressive travel (deformation) of the washer 130. Typically, the conicity may be in the range of from 0.003 inches (0.076 mm.) to 0.008 inches (0.203 mm.) or more with 0.005 inches (0.127 mm.) having been found to be a useful, average and typical value.

While the flat washer 130 is not orientation sensitive, the non-flat, frusto-conical spring washer 130, in a relaxed state, is preferably arranged on the spindle 10 with a convex face or surface 134 facing outward and a concave face 136 facing inward. It will be appreciated that the non-flat shape of the spring washer 130 has been exaggerated somewhat in FIG. 5, for purposes and reasons of explanation and clarity. It should also be appreciated that the spring washer 130 may be installed in the opposite direction on the spindle 10 such that it faces the opposite way as described above, if desired. Finally, it should be appreciated that because the octagonal nut 102 includes the flat inner end face 108 and the locking ring 120 includes the anti-rotation key 124, it is possible, though not preferable, to omit the washer 130 and simply tighten the octagonal nut 102 against the outer roller bearing assembly 24.

Referring now to FIGS. 5, 6 and 8, a third approach to mounting and securing the wheel hub 28 and a pair of tapered roller bearing assemblies 22 and 24 on the spindle 10 according to the present invention will now be described. As in the above described methods, the hub 28, including the inner roller bearing assembly 22 and the oil seal 26 are mounted on the spindle 10, as illustrated in FIG. 5, followed by the outer roller bearing assembly 24 and the flat or non-flat washer 130 with its convex face or surface 134 facing toward the outer end of the spindle 10, as best illustrated in FIG. 5. As noted above, the washer 130 may be omitted. If a flat washer 130 is utilized, the remaining steps are essentially the same as the first method: the nut 102 is threaded on the spindle 18 and tightened down until the desired preload is applied to the inner and outer roller bearing assemblies, the key 124 of the locking ring 120 is located in the keyway 20 and the fasteners 128 are installed and tightened to secure the locking ring 120 to the octagonal nut 102 and prevent its rotation.

The third approach involves use of a dial indicator 150. The dial indicator 150 is installed in a threaded aperture 152 in the nut 102 that is in substantial axial alignment with the outer edge of the non-flat spring washer 130 when both components are installed on the spindle 10. The dial indicator 150 is then zeroed by placing the flat face 108 of the octagonal nut 102 on a smooth, clean, flat surface (not illustrated) at which time the dial indicator 150 is zeroed. Next, the octagonal nut 102 is threaded onto the male threads 18 of the spindle 10 and tightened (torqued) down until the dial indicator 150 reads 0.001 inches, 0.0015 inches or a similar desired value as illustrated in FIG. 8. The dial indicator 150 is then removed from the octagonal nut 102.

The octagonal nut 102 has now been tightened (torqued) down so that it is applying a proper and desired preload to the inner roller bearing assembly 22 and the outer roller bearing assembly 24 as indicated by the deformation of the spring washer 130 and the existence and the size of the gap or clearance as measured by the dial indicator 150. Next, the key 124 of the locking ring 120 is aligned with the keyway 20 in the spindle 10 and the locking ring 120 is mounted upon the spindle 10 adjacent the end face 114 of the octagonal nut 102 without rotating the nut 102.

It will be seen in FIGS. 6 and 7 and appreciated that the pattern of threaded openings 116 and the pattern of the arcuate slots 122 are such that no matter what the rotational positions of the octagonal nut 102 and the locking ring 120 (due to the rotational positioning effected by the keyway 20 and the key 124), there are always at least four threaded openings 126 into which the threaded fasteners 128 may be disposed without adjusting the rotational position of the octagonal nut 102 and upsetting the bearing preload previously set. Such alignment may, it should be noted, necessitate reversal of the locking ring 120 on the spindle 10. With the exception of a grease cap or other cosmetic component (not illustrated), the installation of the wheel hub 28 on the spindle 10 is now complete.

Figure 10:
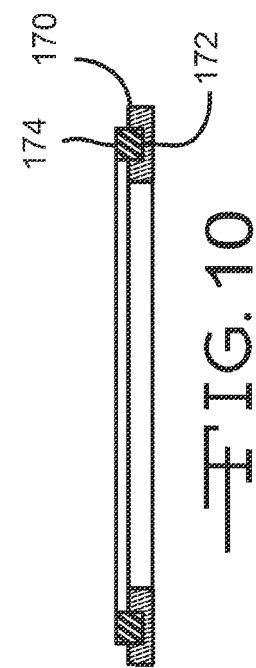
FIG. 10 is a side elevational view of yet another alternate embodiment spring washer including a elastomeric O-ring.
Figure 9:
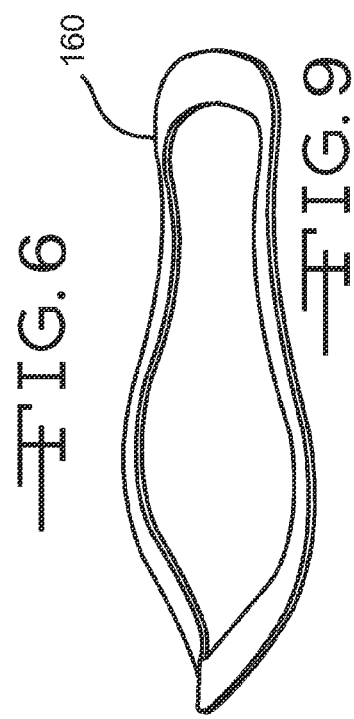
FIG. 9 is a side elevational view of another alternate embodiment non-flat washer such as a wave washer.

FIGS. 9 and 10 illustrate two additional embodiments of the non-flat springs or spring washers 32 and 130. It should be appreciated that other, additional spring or washer configurations may, and likely will, be suitable for use with the present apparatus and method. In FIG. 9, the non-flat washer is a wave washer 160 which defines a repeating, sinuous profile. In FIG. 10, a washer 170 includes a circular groove or channel 172 which receives a stiffly resilient O-ring 174. With both devices, the spring rate can be adjusted, in the case of the wave washer 160 by changing its thickness, increasing or decreasing the number of waves and changing the material, typically a metal alloy from which it is fabricated. In the case of the washer 170, the stiffness of the O-ring 174 can be adjusted by using different materials such as various elastomers and additional O-rings 174 may be disposed in additional grooves or channels 172.

The description of the invention is merely exemplary in nature and variations that do not depart from the gist of the invention are intended to be within the scope of the invention. Such variations are not to be regarded as a departure from the spirit and scope of the invention.

What is claimed is:

1. A spindle nut assembly comprising, in combination,
a nut having a periphery including at least six flats, a first end including a circular flange and a flat surface, a second end, and a locking ring spaced from and secured to said second end by at least a pair of spaced apart lugs, said nut and said locking ring defining axially aligned through openings having continuing female threads, said second end having a first plurality of axially oriented blind threaded openings, said locking ring having a second plurality of axially oriented openings aligned with said first plurality of blind threaded openings, each of said at least one pair of spaced apart lugs disposed between adjacent pairs of said pluralities of openings, and a plurality of threaded fasteners disposed in respective said pluralities of openings, and
a washer disposed adjacent said first end flat surface of said nut.

2. The spindle nut assembly of claim 1 further including a vehicle spindle having at least one bearing assembly and wherein said spindle nut assembly is disposed on said vehicle spindle adjacent said bearing.

3. The spindle nut assembly of claim 1 wherein said threaded fasteners are machine screws having socket heads.

4. The spindle nut assembly of claim 1 wherein said nut and said locking ring are fabricated from a single blank of material.

5. The spindle nut assembly of claim 1 wherein said second plurality of openings have smooth walls.

6. The spindle nut assembly of claim 1 wherein said washer is one of a flat washer, a Belleville spring, and a wave washer.

7. The spindle nut assembly of claim 1 wherein said washer has a circular opening and a key extending into said opening.

8. The spindle nut assembly of claim 1 wherein said circular flange extends radially beyond said flats.

9. A spindle nut assembly for a motor vehicle axle comprising, in combination,
a nut having a periphery including a plurality of flats disposed in parallel pairs, a first end including a circular flange having a flat end surface, a second end face, an axially oriented through center opening having female threads and a first plurality of axially oriented threaded blind openings in said second end face disposed about said center opening, and
a locking ring disposed adjacent and coupled to said second end face of said nut by a plurality of spaced apart standoffs alternating with said first plurality of axially oriented threaded blind openings, said locking ring having a center opening defining female threads aligned and continuing with said female threads in said nut, a second plurality of through openings aligned with said first plurality of threaded blind openings in said nut, and a plurality of threaded fasteners disposed in respective said pluralities of openings.

10. The spindle nut assembly for a motor vehicle axle of claim 9 further including a vehicle spindle having at least one bearing assembly and wherein said spindle nut assembly is disposed on said vehicle spindle.

11. The spindle nut assembly for a motor vehicle axle of claim 9 further including a deformable washer disposed adjacent said flat end surface of said nut.

12. The spindle nut assembly for a motor vehicle axle of claim 9 wherein said plurality of threaded fasteners include at least four machine screws.

13. The spindle nut assembly for a motor vehicle axle of claim 9 wherein said nut and said locking ring are fabricated from a single blank of material.

14. The spindle nut assembly for a motor vehicle axle of claim 9 wherein said circular flange extends radially beyond said flats.

* * * * *